Figure 1:
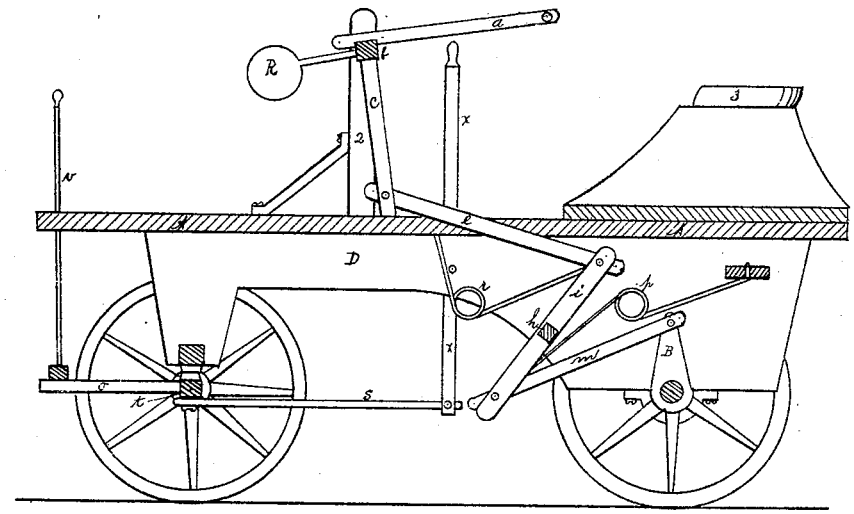

I. WEISHAAR.
Velocipedes.

No. 134,176.

Patented Dec. 24, 1872.

UNITED STATES PATENT OFFICE.

IGNATZ WEISHAAR, OF JOLIET, ILLINOIS.

IMPROVEMENT IN VELOCIPEDES.

Specification forming part of Letters Patent No. 134,176, dated December 24, 1872.

*To all whom it may concern:*

Be it known that I, IGNATZ WEISHAAR, of the city of Joliet, in Will county, and State of Illinois, have invented certain Improvements in Land-Carriages, of which the following is a specification:

The object of my invention is to furnish an easy and fast means of locomotion on the land by means of the device hereinafter particularly set forth.

Figure 1 is a longitudinal elevation through the center of the device.

The device consists of the platform or floor A supported by the frame D resting upon four wheels much like an ordinary wagon, the rear axle being furnished at the center with a crank, B, to which is attached the system of levers $m\ i\ e\ c\ a$. The levers $a\ c$ pivot by means of the bar $b$ to the post $z$, and the lever $i$ at the bar $h$.

The carriage is driven by the operator, who sits in the seat 3, by working the lever $a$, which imparts motion to the crank B, and thereby drives the carriage. The weight R and springs $r\ p$ are intended as auxiliaries to assist in working the said levers. The lever $x$ is used to steer the carriage by means of its connection with one end of the forward axle $t$ by the bar $s$. By moving said lever $x$ backward or forward the carriage may be turned to go in any direction. Also, the lever $v$ attached to the hounds $o$ may be used for the same purpose.

Claims.

Having thus described my invention, what I claim as new and desire to secure by Letters Patent is as follows:

1. The combination of the levers $a\ c\ e\ i\ m$, crank B, springs $r$ and $p$, frame D, and floor A, constructed, operating, and arranged as and for the purposes set forth.

2. The land-carriage described, constructed, operating, and arranged substantially as and for the purposes set forth.

IGNATZ WEISHAAR.

Witnesses:
 THOS. H. HUTCHINS,
 H. LOWE.